Jan. 28, 1969 S. A. TROTT 3,424,360

LEAF SPRING PRESSURE DEVICE FOR CAPSTAN DRIVES

Filed Oct. 22, 1965

SAMUEL A. TROTT
INVENTOR.

KENDRICK, SUBKOW and STOLZY
BY
A. Donald Stolzy
ATTORNEYS

United States Patent Office 3,424,360

Patented Jan. 28, 1969

3,424,360

LEAF SPRING PRESSURE DEVICE FOR CAPSTAN DRIVES

Samuel A. Trott, 10049 Rubio Ave., Granada Hills, Calif. 91344

Filed Oct. 22, 1965, Ser. No. 501,030
U.S. Cl. 226—168 1 Claim
Int. Cl. B65h *17/24, 17/48*

ABSTRACT OF THE DISCLOSURE

A magnetic tape cartridge includes a leaf spring having a convex portion bearing against one side of the tape resiliently urging it against a capstan drive shaft.

Figure 1:
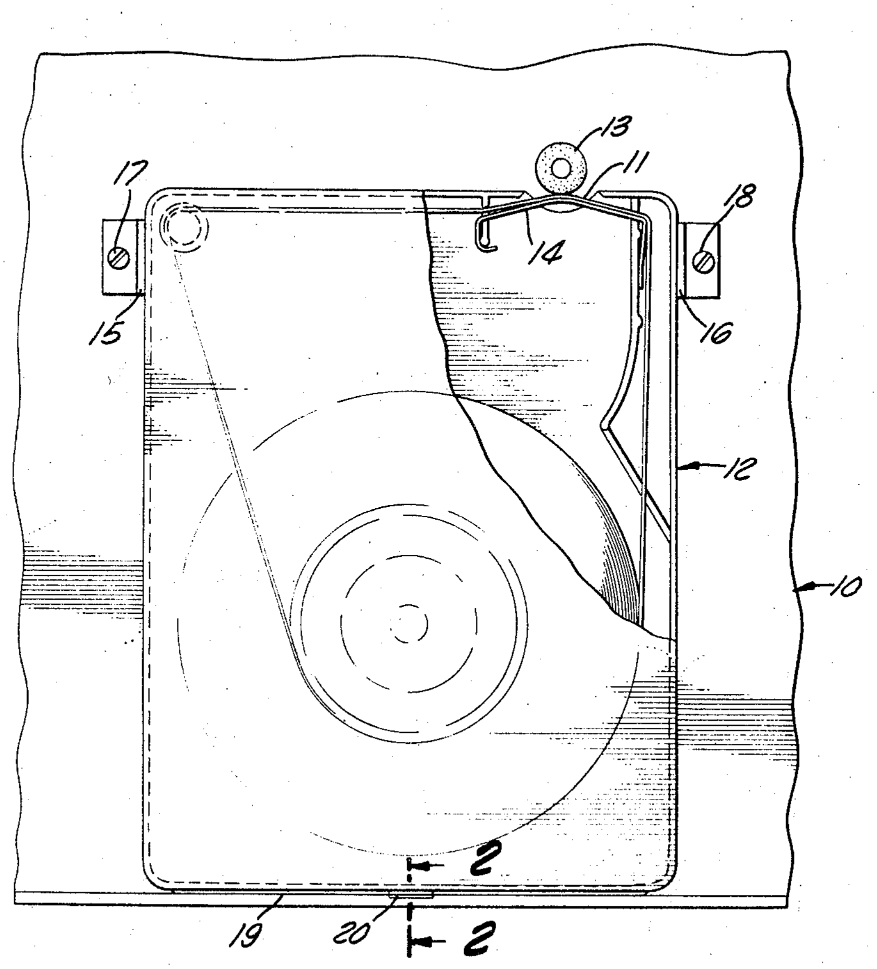

This invention relates to transporting magnetic tape, and more particularly to means for holding magnetic tape against a capstan drive shaft.

In the past, it has been the practice to hold magnetic tape against a drive shaft by the use of a manually operable pinch wheel. The control of the pinch wheel has made necessary the use of a great many large and complicated component parts.

In accordance with the device of the present invention, the above-described and other disadvantages of the prior art are overcome by providing spring means in a magnetic tape cartridge to bear against a capstan drive shaft. The spring means may be simply a leaf spring. Thus, tape pressure against the drive shaft may be maintained with a few small and simple components.

The above-described and other advantages of the present invention will be better understood from the following description when considered in connection with the accompanying drawings.

Figure 2:
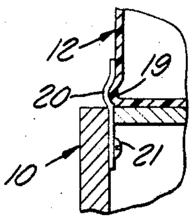

In the drawings, which are to be regarded as merely illustrative:

FIG. 1 is a top plan view of the magnetic tape drive of the present invention; and FIG. 2 is a broken away sectional view of the device taken on the line 2—2 shown in FIG. 1.

A magnetic record player is shown at 10 in FIG. 1 of the type illustrated in U.S. Patent No. 2,876,005. Magnetic tape at 11 is carried in a cartridge 12 similar to the cartridge shown in the said patent. The machine 10 has a capstan drive shaft 13 against which tape 11 is pressed by a leaf spring 14. Cartridge 12 is held in a fixed position on machine 10 by leaf spring 14 bearing against tape 11 and capstan drive shaft 13. It is also maintained in a secure position by guide brackets 15 and 16 fixed to machine 10 by bolts 17 and 18, respectively.

Cartridge 12 has a lip 19 which fits in a spring clip 20 that is fixed to machine 10 by a bolt 21.

From the foregoing, it will be appreciated that the pressure of tape 11 against capstan drive shaft 13 may be maintained by the simple means of leaf spring 14. By the use of this means, the use of a great many large and complicated component parts to perform this function in accordance with the prior art is obviated.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claim.

What is claim is:

1. In apparatus for driving magnetic tape including a housing, a capstan drive shaft projecting from the housing, and a tape cartridge mounted on said housing for containing a supply of tape, the improvement comprising: a leaf spring carried by the cartridge having a convexity contactingly engaging the tape and urging the portion of the tape so engaged into contact with the capstan drive shaft whereby driving engagement of the capstan drive shaft and tape is achieved along a substantially lineal area, said leaf spring being generally elongate and the long dimension of which extends parallel to the tape with the convexity lying intermediate the ends of the spring, the spring portions adjacent the convexity sloping away therefrom such that the tape additionally engages the spring along areas other than the convexity and is guided thereby.

References Cited

UNITED STATES PATENTS

| | | | |
|---|---|---|---|
| 1,871,232 | 8/1932 | Foster | 242—55.13 |
| 2,778,637 | 1/1957 | Eash. | |
| 3,289,906 | 12/1966 | Schuller | 226—168 |
| 3,289,963 | 12/1966 | Taylor | 242—55.19 |

ALLEN N. KNOWLES, *Primary Examiner.*

RICHARD A. SCHACHER, *Assistant Examiner.*

U.S. Cl. X.R.

242—55.19